us008437360B2

(12) United States Patent
Singh et al.

(10) Patent No.: US 8,437,360 B2
(45) Date of Patent: May 7, 2013

(54) STATEFUL DHCPV6 RELAY AGENT IN A CABLE MODEM TERMINATION SYSTEM

(75) Inventors: Hemant Singh, Westford, MA (US); Madhu Sudan, San Jose, CA (US); Shengyou Zeng, Concord, MA (US)

(73) Assignee: Cisco Technology, Inc., San Jose, CA (US)

( * ) Notice: Subject to any disclaimer, the term of this patent is extended or adjusted under 35 U.S.C. 154(b) by 916 days.

(21) Appl. No.: 11/939,647

(22) Filed: Nov. 14, 2007

(65) Prior Publication Data

US 2009/0125957 A1    May 14, 2009

(51) Int. Cl.
*H04L 12/28*    (2006.01)
*H04L 12/56*    (2006.01)
*H04J 3/24*    (2006.01)
*G06F 15/173*    (2006.01)

(52) U.S. Cl.
USPC ............ 370/420; 370/401; 370/474; 709/225

(58) Field of Classification Search ........................ None
See application file for complete search history.

(56) References Cited

U.S. PATENT DOCUMENTS

| | | | | |
|---|---|---|---|---|
| 7,234,163 | B1 * | 6/2007 | Rayes et al. | 726/22 |
| 7,596,614 | B2 * | 9/2009 | Saunderson et al. | 709/224 |
| 2004/0042446 | A1 * | 3/2004 | Koch et al. | 370/352 |
| 2004/0073600 | A1 * | 4/2004 | Elo et al. | 709/201 |
| 2006/0200851 | A1 * | 9/2006 | Hung | 725/111 |
| 2007/0180484 | A1 * | 8/2007 | Siripunkaw et al. | 725/111 |
| 2010/0121946 | A1 * | 5/2010 | Claes et al. | 709/223 |

OTHER PUBLICATIONS

R. Droms et al., RFC-3315: Dynamic Host Configuration Protocol for IPV6 (DHCPv6), Jul. 2003, Network Working Group, The Internet Society.*
M. Patrick, RFC-3046: DHCP Relay AGent Information Option, Jan. 2001, Network Working Group, The Internet Society.*
R. Woundy et al., RFC-4388: Dynamic Host Configuraiton Protocol (DHCP) Leasequery, Feb. 2006, Network Working Group, The Internet Society.*
T. Lemon et al., "Node-specific Client Identifiers for Dynamic Host Configuration Protocol Version Four (DHCPv4)", Network Working Group, Request for Comments: 4361, Feb. 2006, pp. 1-12.

(Continued)

*Primary Examiner* — Faruk Hamza
*Assistant Examiner* — Cassandra Decker
(74) *Attorney, Agent, or Firm* — Weaver Austin Villeneuve & Sampson LLP

(57) ABSTRACT

A CMTS or other data aggregation component having a DHCPv6 relay agent extracts a Media Access Control (MAC) address of an end device from a data packet received from an end device. A DHCPv6 data frame is created for transmission to a DHCPv6 server. The MAC address may be inserted into a specific option of the DHCPv6 data frame, where data in the option may not be processed by the server and are echoed back to the aggregation component or CMTS. The DHCPv6 data frame is transmitted to the DHCPv6 server. The component receives a response message from the server that may contain the MAC address or similar client hardware address as it was sent to the server by the network component. The network component may determine an outgoing port interface from which the response message should be sent, utilizing the MAC address and an interface bundling table. In this manner, interface bundling may be enabled.

19 Claims, 11 Drawing Sheets

OTHER PUBLICATIONS

R. Droms (ed.) et al., "Dynamic Host Configuration Protocol for IPv6 (DHCPv6) draft-ietf-dhc-dhcpv6-28.txt", Internet Engineering Task Force, Internet Draft, DHC Working Group, Nov. 2, 2002, pp. 1-91.

CM-SP-MULPIv3.0-I01-060804, Data-Over-Cable Service Interface Specifications DOCSIS 3.0, "MAC and Upper Layer Protocols Interface Specification", Aug. 4, 2006.

* cited by examiner

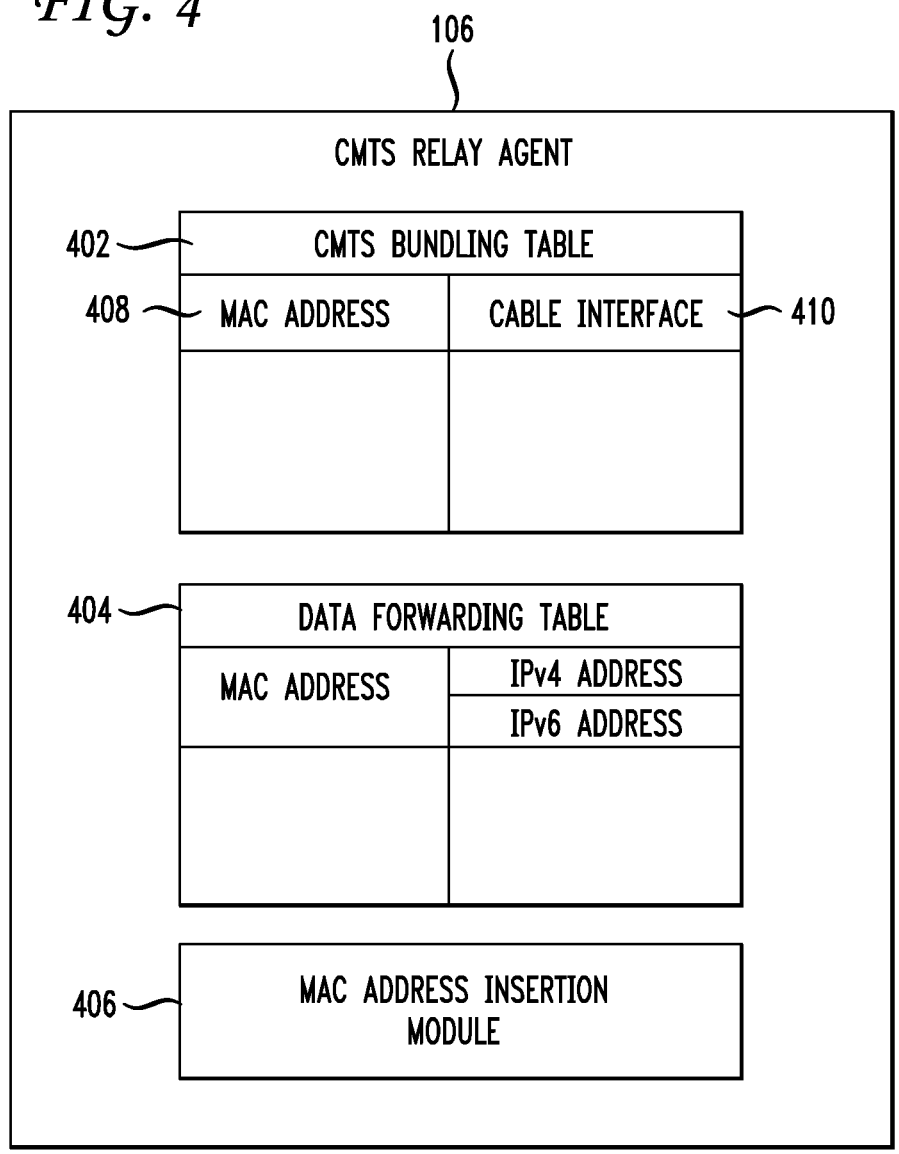

DHCPv6 MESSAGE FORMAT

| MESSAGE TYPE | HOP-COUNT | LINK ADDRESS | PEER ADDRESS | OPTIONS |
| --- | --- | --- | --- | --- |
| 502 | 504 | 506 | 508 | 510 |

| OPTION-INTERFACE-ID | LENGTH | INTERFACE-ID |
| --- | --- | --- |
| 514 | 516 | 518 |

STATEFUL DHCPV6 RELAY AGENT IN A CABLE MODEM TERMINATION SYSTEM

BACKGROUND OF THE INVENTION

The present invention relates to cable modem termination system (CMTS) software. Cable operators and multi-service operators (MSOs) who deploy and maintain cable modems at subscriber residences and businesses rely on the cable modem's Media Access Control (MAC) address or other hardware address to perform important functions. However, in version 6 of the Dynamic Host Configuration Protocol (DHCPv6), there was a deliberate design decision to not include a field for a MAC address. In DHCPv4 and Internet Protocol version 4 (IPv4), the MAC address was stored in a "chaddr" (client hardware address) field. MSOs and other entities continue to want to utilize MAC addresses for various tasks, such as error handling, debugging, interface bundling, lease query, and others.

However, MSOs do not want to impose changes in hardware in the cable modems they deploy or, moreover, in the customer premise equipment (CPE), such as PCs, televisions, and the like, that operate behind the cable modem. Such devices operate outside of Data-Over-Cable Service Interface Specifications (DOCSIS) 3.0 and RFIs describing the new protocols. Nor do MSOs want to force changes to the DHCPv6 server which provides IP addresses to the modems and CPEs. Further, DHCPv6 server behavior is not covered by DOCSIS 3.0 standards. However, with the advent of DHCPv6 and IPv6, alternatives to the utilization of MAC addresses of the cable modem and the CPE are inefficient with respect to memory and processing time.

BRIEF DESCRIPTION OF THE DRAWINGS

References are made to the accompanying drawings, which form a part of the description and in which are shown, by way of illustration, particular embodiments:

FIG. 4 is a block diagram of example components in a CMTS relay agent in accordance with particular embodiments;

DESCRIPTION OF EXAMPLE EMBODIMENTS

In this application, numerous specific details are set forth in order to provide a thorough understanding of the example embodiments. It will be obvious, however, to one skilled in the art, that these embodiments may be practiced without some or all of these specific details. In other instances, well known process steps have not been described in detail in order to not obscure the example embodiments.

Overview

In one embodiment, a network aggregator, such as a CMTS, having a processor may include a memory storing an interface bundling table having a MAC address field and a port interface field and may also include a data forwarding table also having a MAC address field and one or more IP address fields. The network aggregator may also have a bundle interface having physical cable interfaces aggregated into a virtual interface, the bundle interface may have at least one end device IP address and a MAC address stored on the physical cable interfaces. A MAC address insertion module in the network aggregator may insert one or more MAC addresses into a specific option of a DHCPv6 message. The DHCPv6 message may be transmitted to a DHCPv6 server and a return message, containing the same one or more MAC addresses, is received from the DHCPv6 server.

In another embodiment, a method is described in which a network component, such as a CMTS or other data aggregation component extracts a MAC address of an end device, such as a cable modem or consumer premise equipment, from a data packet. A DHCPv6 data frame may be created for transmission to a DHCPv6 server. The MAC address may be inserted into a specific option field of the DHCPv6 data frame, where data in the option may not be processed by the server and are returned by the server to the network component. The network component may receive a response message from the DHCPV6 server, the response message containing the MAC address as it was sent to the server. The network component may determine an outgoing port interface from which the response message or associated message is sent by utilizing the MAC address and an interface bundling table. In this manner interface bundling may be enabled.

EXAMPLE EMBODIMENTS

Figure 1:
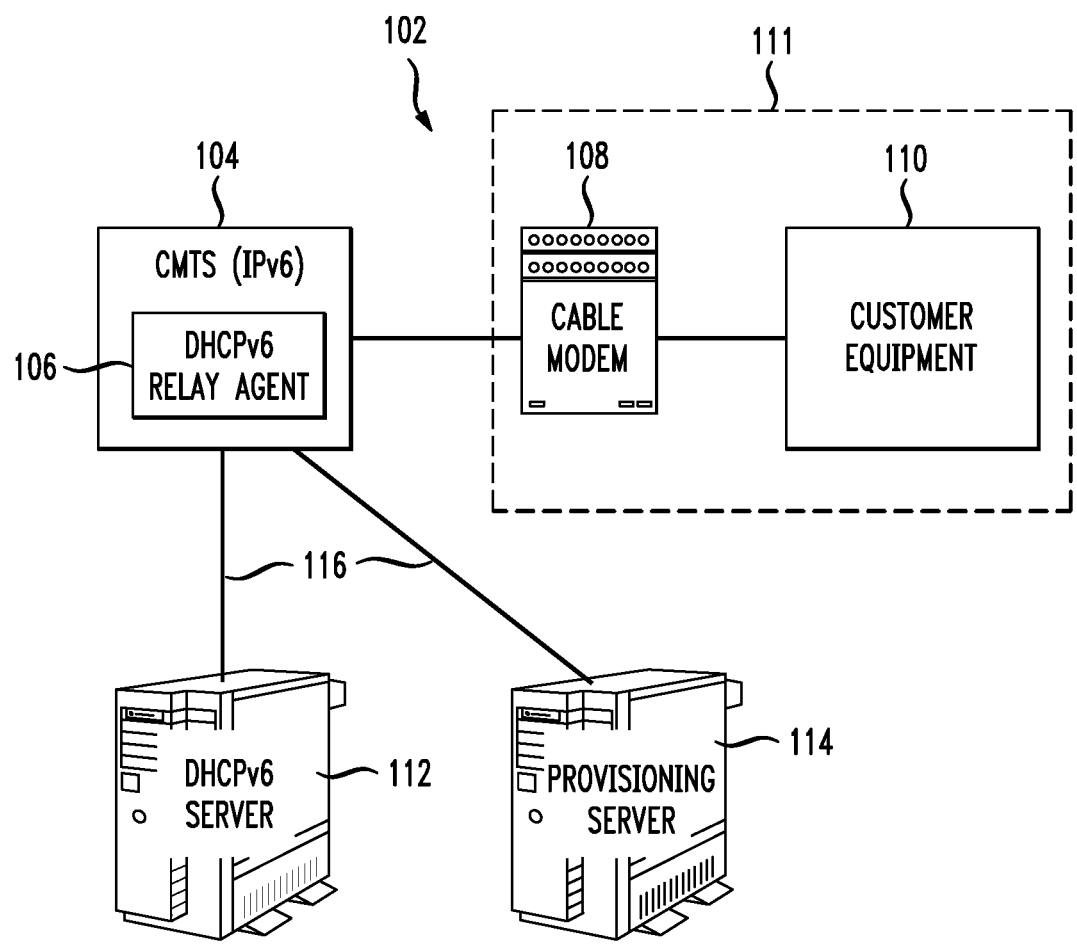
FIG. 1 is a block diagram of a cable network and related components in accordance with particular embodiments.

FIG. 1 is a block diagram of a cable network and related components in accordance with particular embodiments. A cable plant 102 has a CMTS 104 and a relay agent 106. CMTS 102 is connected to a cable modem 108, for example, at a customer's residence or at a place of business. The connection (part of cable plant network 102) may be a fiber network connection or any suitable one or more types of connections as may be used to connect a head end to cable modems for broadband connectivity. Cable modem 108 may be used to the benefit of a CPE 110, such as a PC, a television, or other customer premise equipment needing broadband Internet access. As described below, cable modem 108 and CPE 110 each have a MAC address or other type of client hardware address. Also shown in FIG. 1 are a DHCPv6 server 112 and a provisioning server 114, such as a TFTP server. In particular embodiments, server 112 may be connected to CMTS 104 via the Internet, represented by connection 116. Provisioning server 114 may also be connected to CMTS 104 via connection 116. FIGS. 8 to 11 below provide greater detail on cable modem networks and CMTS 104. In particular embodiments, CMTS 104 operates according to the IPv6 protocol, as does cable modem 108. In particular embodiments, DHCP sever 112 and relay agent 106, as indicated above, operate according to the DHCPv6 protocol.

Examples of a cable modem network and a CMTS are used to describe particular embodiments. Other examples of networks and aggregation routers or broadband aggregators may also be used to describe embodiments. For example, the following deployments may also be used to describe particular embodiments, such as Wholesale Dial/Voice networks and various forms of DSL/ETTH/WLAN (wireless networks), including the Point-to-Point Model, the PPP Terminated Aggregation (PTA) Model, and the L2TP Access Aggregation (LAA) Model.

Figure 2:
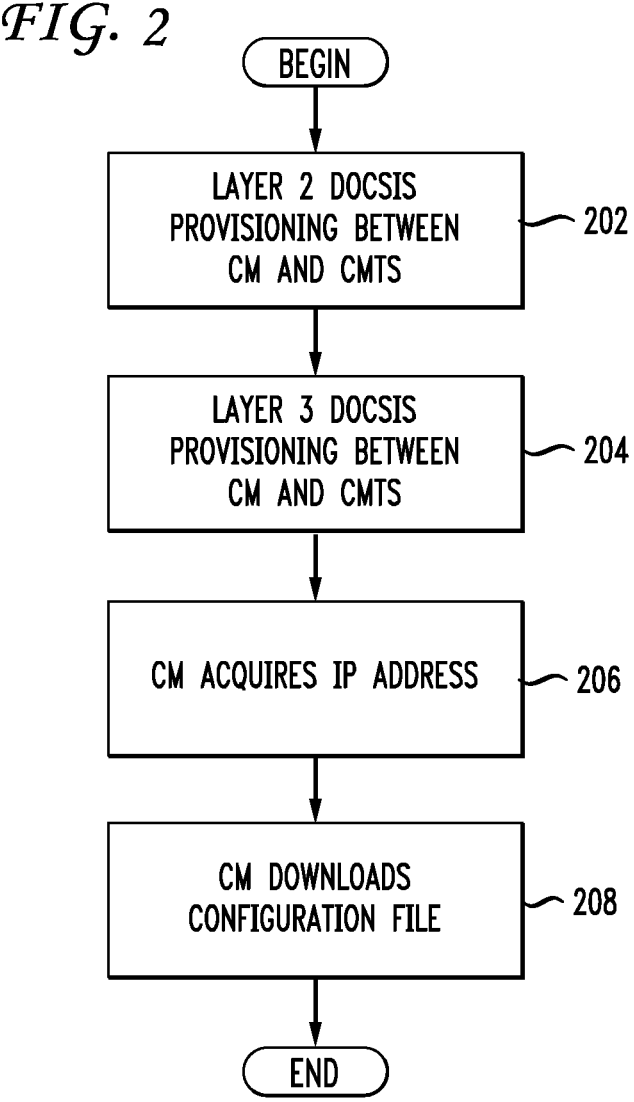
FIG. 2 is a flow diagram of an example overview process of initial provisioning between a cable modem (CM) and a CMTS in a cable modem network.

FIG. 2 is a flow diagram of an example overview process of initial provisioning between a cable modem and a CMTS in a cable modem network. At step 202, Layer 2 (L2) DOCSIS provisioning is performed between cable modem 108 and CMTS 104. At this stage CMTS 104 may obtain the MAC address of cable modem 108 and/or of CPE 110. At step 204, Layer 3 (L3) provisioning is performed between cable modem 108 and CPE 110. At step 206, cable modem 108 obtains an IP address from DHCP server 112. In a particular embodiment, the IP address is in IPv6 format. At this stage CPE 110 may also obtain an IP address from server 112. In other embodiments, CPE 110 may obtain an IP address via other suitable means. At step 208 cable modem 108 downloads one or more configuration files from provisioning server 114. The configuration file contains various quality of service information such as the data rate or speed cable modem 108 will operate with. At this stage cable modem 108 has registered with CMTS 104.

Figure 3:
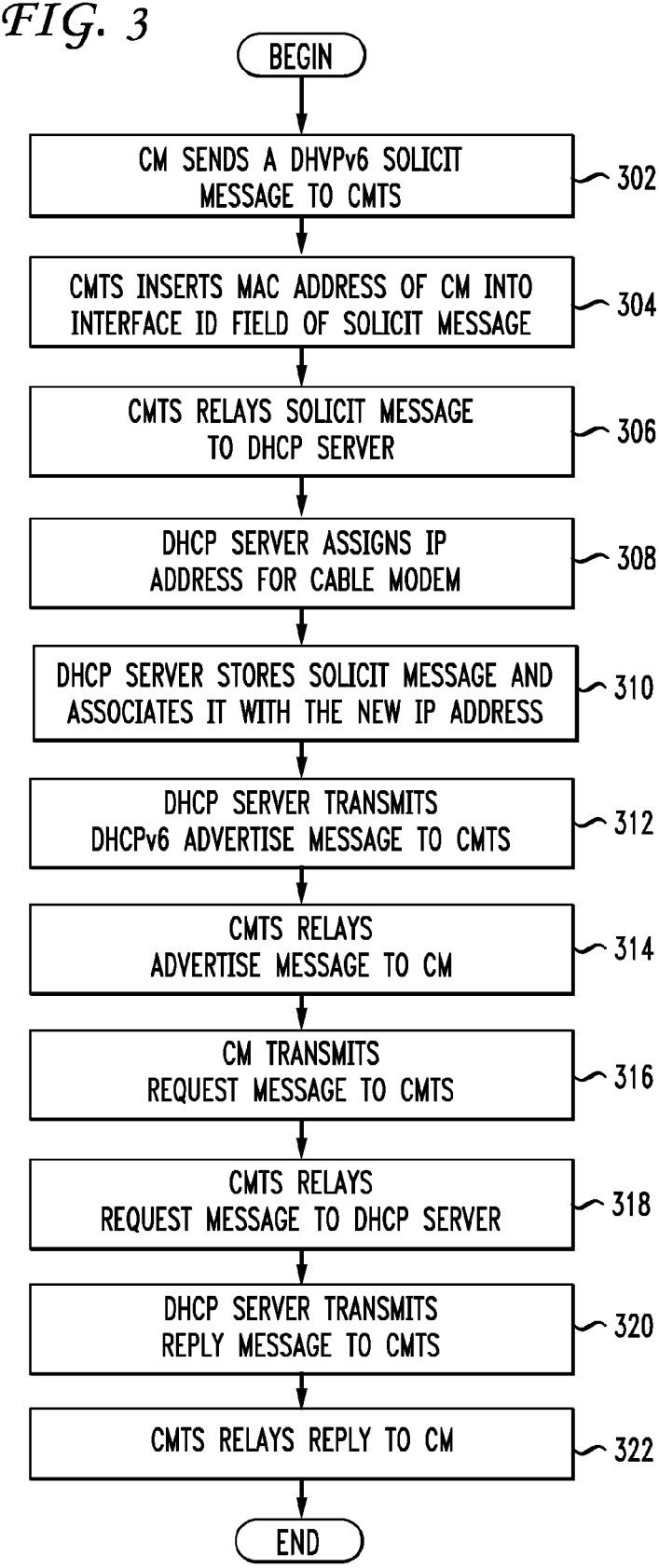
FIG. 3 is a flow diagram of an example process showing in greater detail initial provisioning between a cable modem (CM) and a CMTS in DHCPv6 protocol in accordance with particular embodiments.

FIG. 3 is a flow diagram of an example process showing in greater detail initial provisioning between a cable modem and a CMTS in DHCPv6 protocol in accordance with particular embodiments. Upon powering up cable modem 108 (connected to CPE 110, which may not be powered up at the same time), at step 302 modem 108 sends a DHCPv6 SOLICIT message to CMTS 104. In particular embodiments, the message is in a format conforming to DHCPv6 protocol, described in greater detail below. At step 304 CMTS 104 inserts a MAC address or similar client hardware address of modem 108 into a specific option or field of the RELAY-FORWARD message. In one embodiment, the SOLICIT message is a RELAY-FORWARD type message. In particular embodiments, the specific option is the DHCPv6 Interface ID option, described in detail below. The CMTS may have previously obtained the MAC address of the cable modem during Layer 2 provisioning at step 302 of FIG. 3. In another embodiment, CMTS 104 also obtains the IP address of CPE 110. In addition to the MAC or client hardware address, other data may also be stored in the option. In particular embodiments, CMTS 104 relays the modified SOLICIT message now containing the MAC address of the CM to the DHCPv6 server 112 as a CMTS RELAY-FORWARD message.

At step 308 DHCPv6 server 112 assigns an IP address for cable modem 108. During this step, server 112 may create a corresponding record in an IP address table in the server's memory. At step 310 DHCPv6 server 112 stores the data in the SOLICIT message and associates it with the newly assigned IP address. In a particular embodiment, a table in server 112 stores IP addresses and associated data. At step 312 DHCPv6 server 112 transmits an DHCPv6 ADVERTISE message to CMTS 104. In particular embodiments, the message may contain the contents of the interface id option, such as the MAC addresses of the cable modem or both the cable modem and CPE. At step 314 CMTS 104 relays the DHCPv6 ADVERTISE message to cable modem 108. At step 316 cable modem 108 transmits a REQUEST message to CMTS 104 and one embodiment of an initial provisioning process is complete.

FIG. 4 is a block diagram of example components in a CMTS relay agent in accordance with particular embodiments. In particular embodiments, relay agent 106 in CMTS 104 operates under DHCPv6 protocol and has a CMTS interface bundling table 402 and a Layer 2 data forwarding table 404. In particular embodiments, interface bundling table 402 has a MAC address field 408 and a cable interface field 410, both shown as columns in FIG. 4. Table 402 is used to determine which specific physical interface or output port a data frame should be transmitted from CMTS 104 to a destination on CMTS downstream. Data forwarding table 404 has a MAC address field 412 and, in particular embodiments, a corresponding IPv4 address field 414 and an IPv6 address field 416 of cable modem 108 or of CPE 110. In particular embodiments, also included in relay agent 106, is software for inserting a MAC address of a cable modem or a CPE into a DHCPv6 message for transmission to server 112. It is worth noting that relay agent 106 may relay messages between DHCP server 112 and various types of end devices, including cable modems ("CM DHCPv6 message") and CPEs ("CPE DHCPv6 message"). Software for performing the insertion into the message, specifically, in one example, into the interface id option field of the message, is represented in FIG. 4 by MAC address insertion logic module 406. In particular embodiments, the software for performing the insertion is not a separate component or module, such as module 406, but rather is integrated generally with other software in relay agent 106.

Figure 5A:
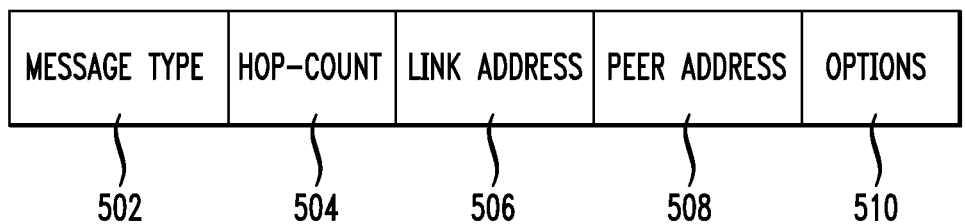
FIG. 5A is a block diagram showing an example format of one type of DHCPv6 message.

FIG. 5A is a block diagram showing an example format of one type of DHCPv6 message. This message format may be used for messages being transmitted between relay agent 106 and server 112. Messages in this format may be created at either one of these components. Format 500 includes a message type field 502, a hop count field 504, a link address field 506, a peer address field 508, and an options field 510. Hop count field 504 may contain the number of relay agents that have relayed the specific message. Link address field 506 may contain a global or site-local address that may be used by the DHCP server to identify the link on which the end device is located. Peer address field 508 may contain the address of the end device or the relay agent from which the message to be relayed was received.

Figure 5B:
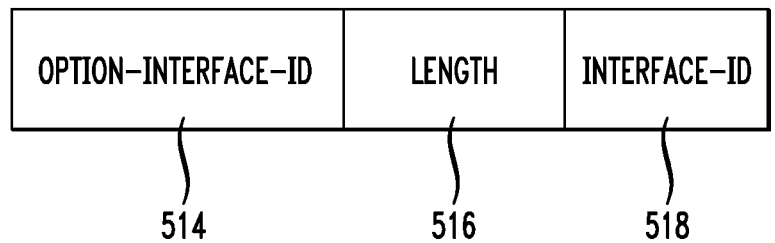
FIG. 5B is a block diagram showing an example format of an interface id option in DHCPv6 protocol.

FIG. 5B is a block diagram showing an example format of an interface id option in the DHCPv6 protocol. In other embodiments, other options that meet certain criteria, as described below, may be used. The Interface ID option is used to illustrate particular embodiments. In a particular embodiment, the Interface ID option stores an opaque value of arbitrary length generated or determined by relay agent 106. An interface ID option format 512 has an option_Interface_ID field 514 representing the code for this specific option in DHCPv6, such as a numeral identifier or text (e.g., interface id). Field 516 contains the length of the data stored Interface_ID option data. In a particular embodiment, the length is represented by an unsigned integer providing the length of field 518. Field 518 contains the actual data stored in the option. In a particular embodiment, the data includes at least the MAC address of either a cable modem or a CPE. In another embodiment, the data are the MAC addresses of the cable modem and the CPE. Other types of data may also be stored together with MAC addresses, for example, data relating to interface bundling. The value in length field 516 depends directly on the data that are stored in field 518.

As described below, DHCPv6 server 112 may not parse or process data in Interface ID field 518. That is, the Interface ID is stable, opaque, and remains unchanged. In particular embodiments, data in field 518 are echoed to relay agent 106 or, more generally, to CMTS 104. In particular embodiments, server 112 copies the Interface ID option data from a RELAY-FORWARD message into a RELAY-REPLY message that server 112 sends to relay agent 106 in response to the RELAY-FORWARD message.

Figure 6:
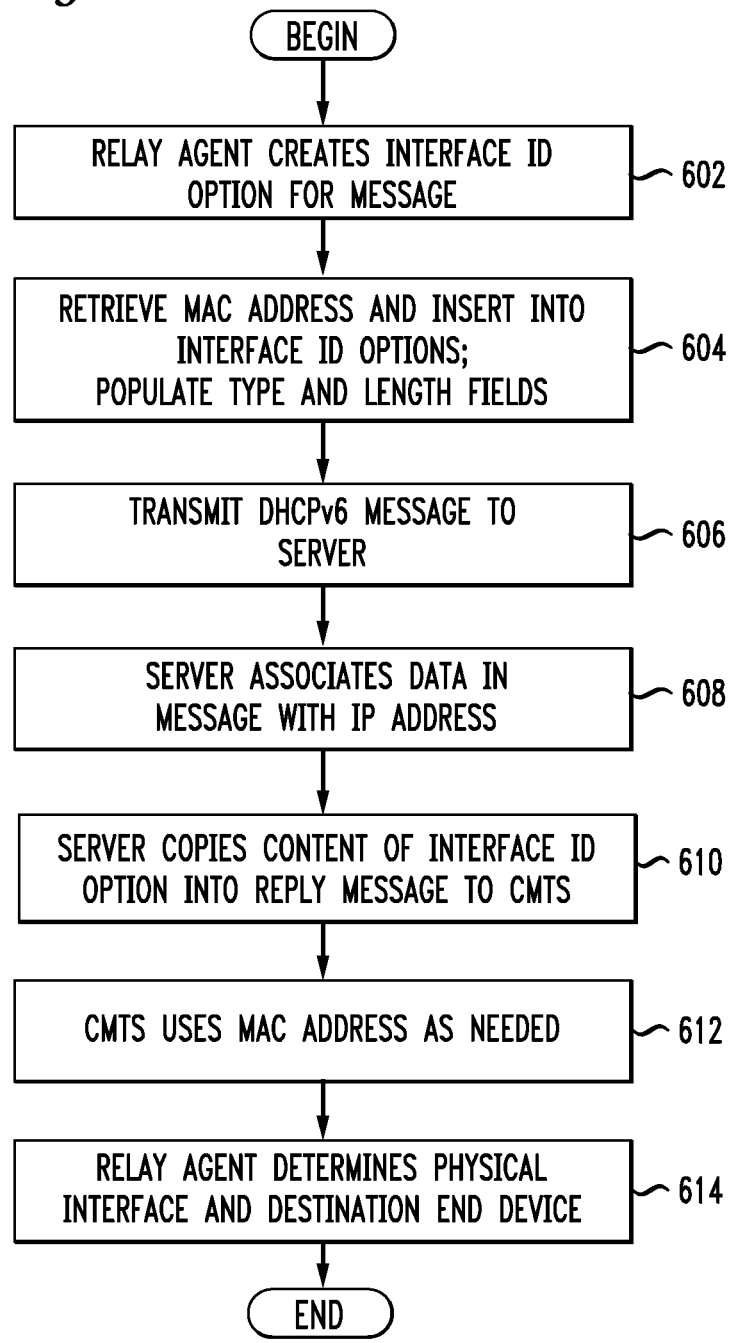
FIG. 6 is a flow diagram of an example process of transmitting and receiving messages between a relay agent in a CMTS and a DHCPv6 server in accordance with particular embodiments.

FIG. 6 is a flow diagram of an example process of transmitting and receiving messages between a CMTS relay agent and a DHCPv6 server in accordance with particular embodiments. At step 602 DHCPv6 relay agent 106 in CMTS IPv6 104 creates a message and, specifically, the Interface ID option for transmission (or relay) to server 112. In particular embodiments, this message may be referred to as a RELAY-FORWARD message and, more specifically, may be, for example, a SOLICIT message or a REQUEST message as described in FIG. 3. At step 604 relay agent 106 obtains the MAC address of the cable modem which may be, for example, currently performing initial provisioning and inserts the MAC address into Interface ID field option 518. The MAC address of the CPE may also be inserted into option 518 in the situation where relay agent 106 is relaying a message on behalf of the CPE. The MAC address may be derived from the Ethernet frame that the CMTS receives from the end device. In particular embodiments, other data may be inserted into Interface ID field 518, such as data relating to master and slave bundling. Once the data have been populated into field 518, length field 516 is populated with the length of the data inserted into field 518. Insertion module 406 may also calculate the length of the data that has been or will be inserted into Interface ID option.

At step 606 relay agent 106 transmits the DHCPv6 RELAY-FORWARD message to server 112 in the embodiment where the Interface ID option is used. This may be done over the Internet or any other appropriate communication medium. At step 608, server 112 receives the message and may associate data in the message with the cable modem or CPE. In particular embodiments, this may be done by coupling data in the message to the IP address assigned to the end device by server 112 and stored into a table having an IP address field and a device data field. As explained below, these device data may be used by the CMTS for queries on an end device or for functions such as lease queries and functions highly useful to MSOs and cable modem and CMTS manufacturers, described below.

At step 610 server 112 transmits a message back to CMTS 104. For example, server 112 may send a RELAY-REPLY message. More specifically, in particular embodiments, server 112 echoes back the contents of Interface ID option 518 back to relay agent 106. According to the DHCPv6 protocol, the content of this field is not parsed or processed, that is, it is opaque, and as such, is stable and remains unchanged. The content is copied into the same field in the reply message to relay agent 106. For example, in the case of the Interface ID option, the RELAY-REPLY message may be an ADVERTISE or DHCPv6 REPLY message as described in FIG. 3. In other embodiments, other options having the same or similar properties to the Interface ID option, namely, that the option be opaque and copied verbatim in a message from server 112 and also echoed by the server in responses, may be used. At step 612 CMTS 104 may use the returned MAC address of cable modem 108 or of CPE 110 for various functions. Some of these uses of the MAC address are described in detail below. One use of the MAC address is determining the physical interface and specific cable modem or end device to which the message should be relayed. In particular embodiments, this may be done by using CMTS bundling table 402 and data forwarding table 404, both of which use the MAC address as a key to find a physical interface of the CMTS and a specific IP address (either in IPv4 or IPv6), of the end device respectively.

Figure 7:
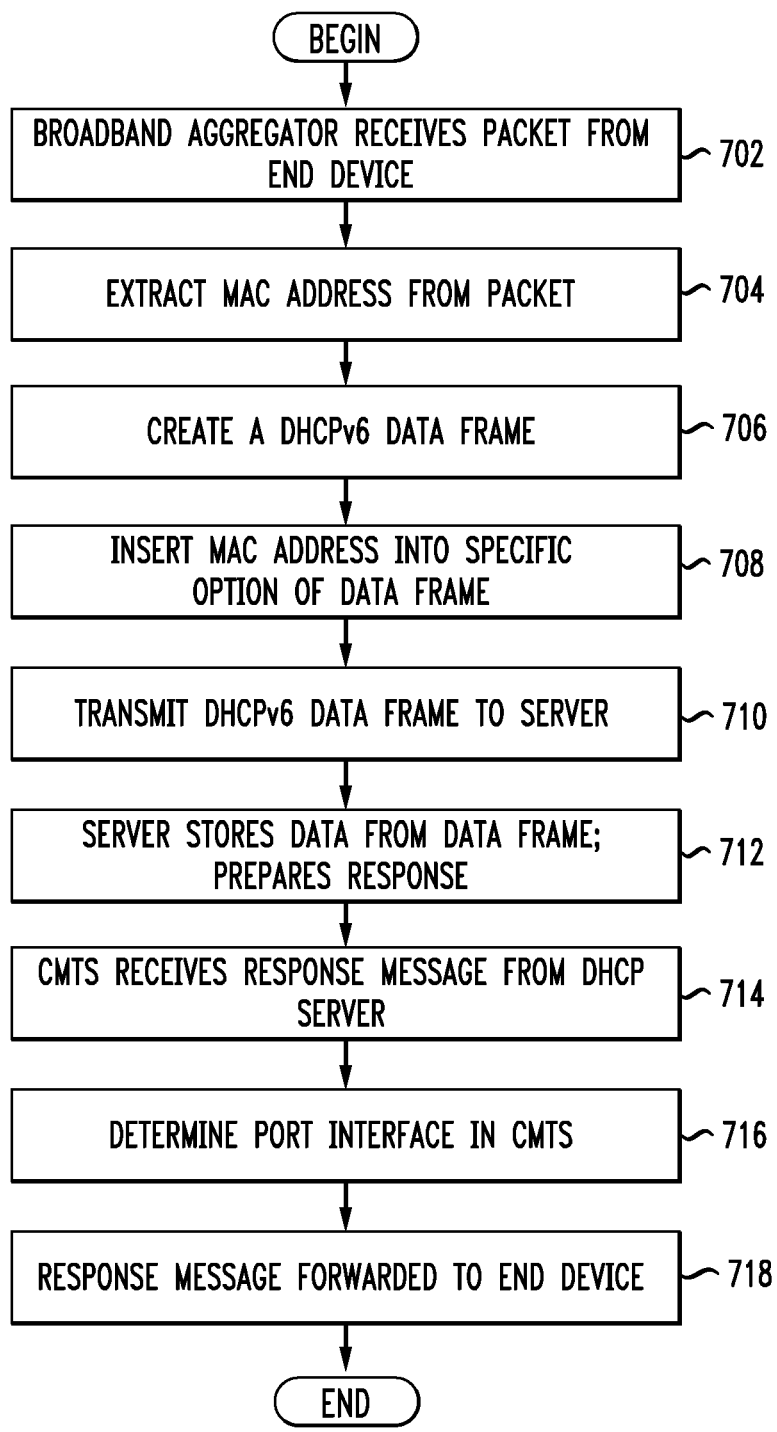
FIG. 7 is a flow diagram of an example process of inserting a MAC address into a DHCPv6 message at a CMTS or other broadband aggregator in accordance with particular embodiments.

FIG. 7 is a flow diagram of an example process of inserting a MAC address into a DHCPv6 message at a CMTS or other broadband aggregator in accordance with particular embodiments. At step 702 the CMTS receives a data packet from an end device, where the data packet may contain the MAC address of the device. The device may be a cable modem, a CPE, such as a PC, Internet appliance, and the like, or any other device that may be aggregated in a network and connected to a broadband aggregator. At step 704, software in the CMTS extracts the MAC address of the end device from the data packet. At step 706 the CMTS or broadband aggregator creates a DHCPv6 data frame for transmission to a DHCPv6 (or v4/v6) server. An example format of such a data frame is described in FIGS. 5A and 5B. Among the various data items stored in the data frame, one is the MAC address of the end device. At step 708 the MAC address is inserted into an option of the DHCPv6 data frame having particular features, namely, of not being processed by the DHCP server and of being echoed back to the originating device, such as the CMTS or other broadband aggregator. In particular embodiments, the specific option is the Interface ID option.

At step 710, the DHCPv6 data frame (also referred to as "DHCP message") is transmitted to the server, for example, over the Internet or other suitable network connection. At step 712, the server stores certain information contained in the data frame in its memory, for example, for inquiries made by the CMTS about a particular end device. The server may have a table of records where a record corresponds to an end device and can be searched using IP address (which the DHCP server may assign), MAC address, or other means. At step 714 the CMTS receives a response message from the DHCPv6 server which, in particular embodiments, contains the MAC address of the end device as the address was sent to the server from the CMTS. In particular embodiments, the MAC address is returned or echoed to the CMTS unprocessed by the DHCP server.

At step 716 the DHCPv6 relay agent of the CMTS uses the MAC address returned by the DHCP server and interface bundling table 402 stored in CMTS software to determine which port interface the response message should be sent to in the CMTS. In particular embodiments, the port interface is a bundle or Layer 2 interface which has been assigned a single IP subnet address. Interface bundling is described in greater detail below. By having the MAC address returned to the CMTS, interface bundling is being enabled in a CMTS having a DHCPv6 relay agent. At step 718 the response message is forwarded to its intended end device. In particular embodiments, the specific IP address (either v4 or v6) of the end device is located by the relay agent using the MAC address to search data forwarding table 404 in the CMTS software.

Figure 11:
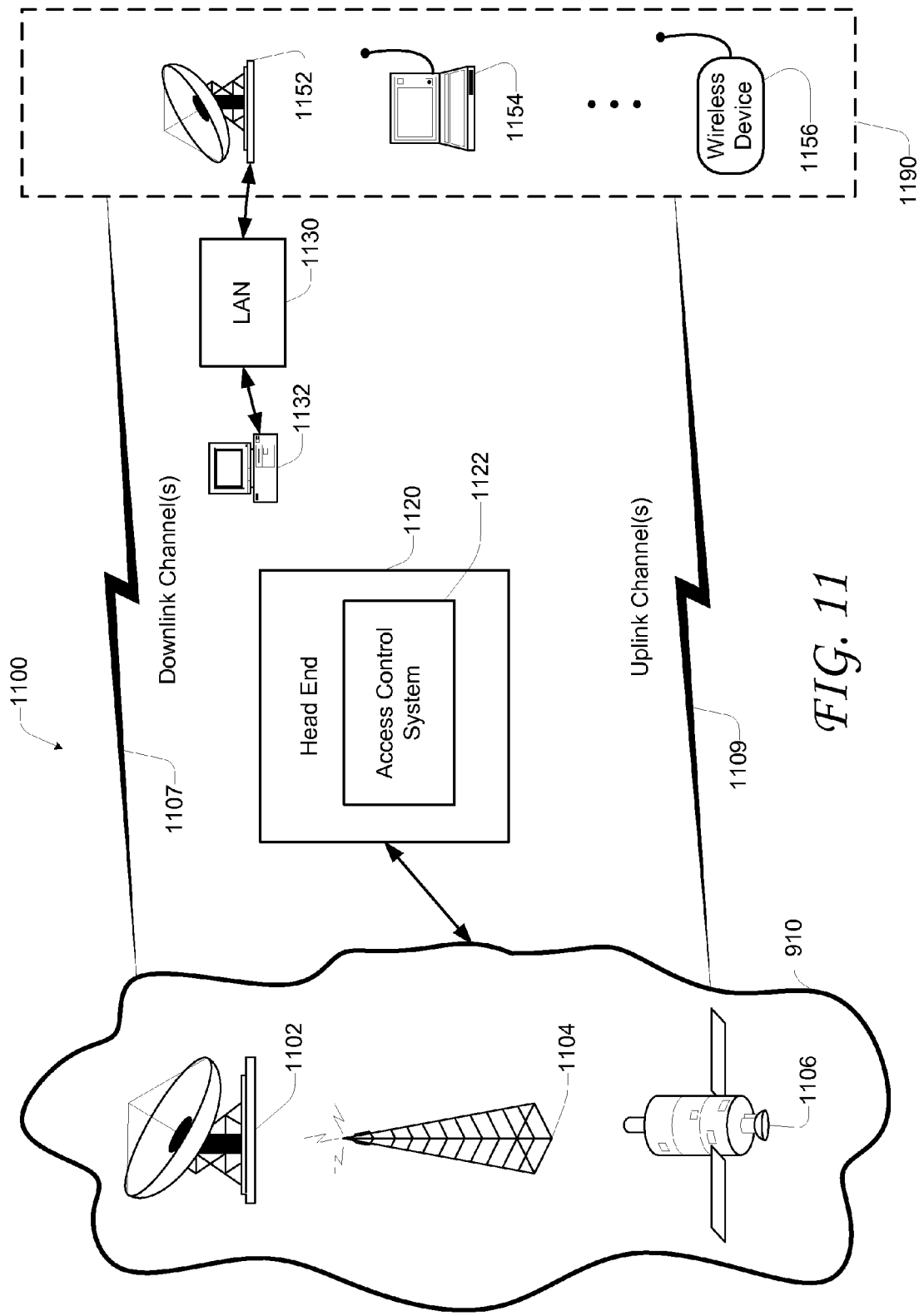
FIG. 11 is a block diagram of an example wireless data communication system in accordance with particular embodiments.

Various embodiments described herein may be utilized in a variety of access networks, such as, for example, cable or HFC networks, digital video broadcasting (DVB) networks, wireless networks, and/or other types of shared access networks. An example of a wireless network portion is shown in FIG. 11. An example of a cable network portion is shown in FIG. 8.

Figure 8:
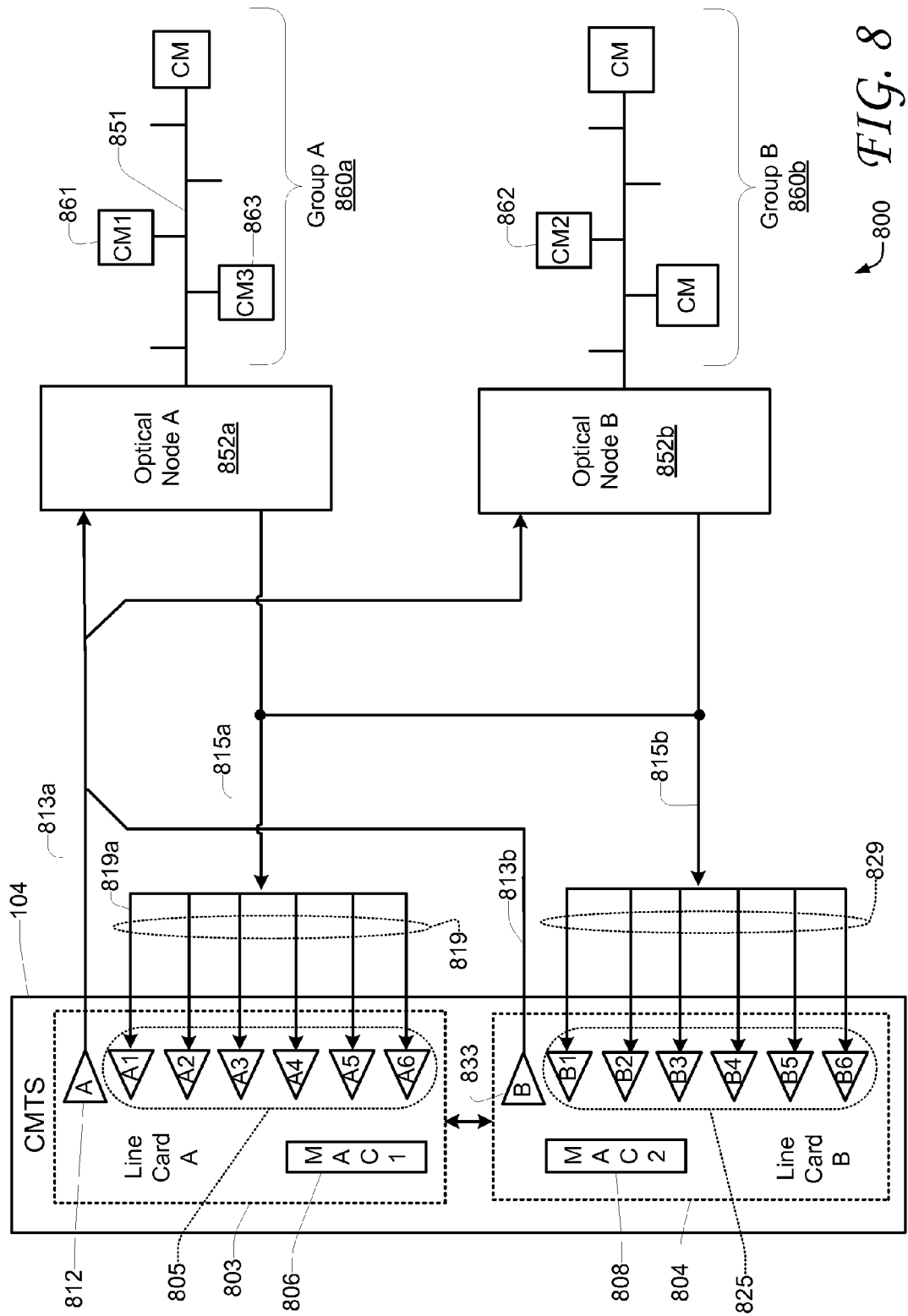
FIG. 8 is a block diagram of an example cable network segment including a head end configured to provide interactive services and communications.

As illustrated in the example of FIG. 8, the cable network portion may include a head end which is configured to provide interactive services and communications with a plurality of network nodes (e.g., cable modems) and/or CPEs. In order to provide interactive network functionality, the head end may include CMTS 104. A head end may include physically distinct line cards, such as, for example, Line Card A 803 and Line Card B 804. Each line card may connect to one more optical nodes, such as, for example, Optical Node A 852a and Optical Node B 852b. These optical nodes may communicate with one or more groups of cable modems (and/or other network nodes) such as, for example, one or more cable modems in Group A 860a and/or Group B 860b.

Other types of shared access networks may include other types of hardware and/or software configurations for enabling communication between the head end and plurality of network nodes. The particular embodiments described above are not limited to use in cable networks, but rather may be utilized and/or adapted for use with any type of shared access network.

In at least one embodiment, several types of access modes may be used in a cable network to allow cable modems to communicate with CMTS 104 via a shared access upstream channel. One access mode is based on contention access, which lets users send information upstream during designated contention-based timeslots. During these contention-based timeslots, there is a risk that one or more collisions may occur with other users' transmissions. Cable modem sign-on operations may be performed using contention-based timeslots (commonly referred to as Initial Maintenance (IM) slots or Ranging slots). Other modes of access on the upstream channel are non-contention based, such as, for example, data grant timeslots, which are timeslots specifically allocated or reserved for use only by designated cable modems. These different types of access modes may be dynamically shared among the various timeslots available on a given upstream channel, which allows cable modems to know when contention based transmission is or is not allowed. This may also help to avoid collisions for the non-contention based access modes.

In particular embodiments, the shared access network may be adapted to utilize a standardized communication protocol for enabling communication between the head end and network nodes. For example, in at least one embodiment, the shared access network may be operable to utilize the DOCSIS protocol such as for example, the DOCSIS Radio Frequency Interface (RFI) Specification CM-SP-RFIv2.0-I11-060602 standard and/or the DOCSIS 3.0 standard (CM-SP-MULPIv3.0-I05-070803), each of which is available at www.cablelabs.com. In other embodiments, other versions of the DOCSIS Radio Frequency Interface Specification may be used. However, for purposes of illustration, particular embodiments described above use the DOCSIS 3.0 protocol.

For example, in one embodiment, as part of the sign-on procedure described in the DOCSIS standard, a cable modem may be required to perform a variety of different activities and/or operations in a particular ordered sequence. Examples of such activities and/or operations may include, but are not limited to, one or more of the following (or combination thereof): initial ranging activities; periodic ranging activities; Dynamic Host Configuration Protocol (DHCP) activities; Trivial File Transfer Protocol (TFTP) activities; time of day determination activities; and registration activities. Other examples are described in FIGS. 2 and 3.

FIG. 8 shows a block diagram of a hybrid-fibre coaxial (HFC) network in accordance with a specific embodiment. However, various aspects and/or techniques described herein may also be applicable to other cable network implementations and/or other types of shared access networks.

As shown in FIG. 8, network portion 800 includes a head end, which includes CMTS 104, and multiple nodes (e.g., cable modems such as 861, 862, 863, etc.), and multiple upstream and downstream channel interfaces (e.g., interfaces 805, 812, 825, 833). In a particular embodiment, CMTS 104 is operable to function as the head end of the access network. CMTS 104 is operable to communicate with a plurality of subscriber groups (e.g., 860a, 860b), wherein each subscriber group includes a plurality of cable modems. In at least one embodiment, CMTS 104 may communicate with selected cable modems via one or more fiber nodes (e.g., 852a, 852b). Desired combinations of upstream and/or downstream ports across different line cards may be logically grouped together to form different logical domains (e.g., logical DOCSIS domains).

In one embodiment, CMTS 104 may include physically distinct line cards, e.g. Line Card A 803 and Line Card B 804. Each line card may include one or more upstream ports (e.g., 805, 825) and/or downstream ports (e.g., 812, 833). In one embodiment, each line card within CMTS 104 may include a respective MAC controller (e.g., 806, 808).

In particular embodiments, domain assignments within the CMTS may be flexible and may be logically based. For example, in at least one embodiment, a separate DOCSIS domain (or CMTS domain) may be assigned to one or more selected fiber nodes within the HFC network. Alternatively, a single DOCSIS domain may be allocated to the entire CMTS chassis, which may be connected to one or more fiber nodes.

Figure 9:
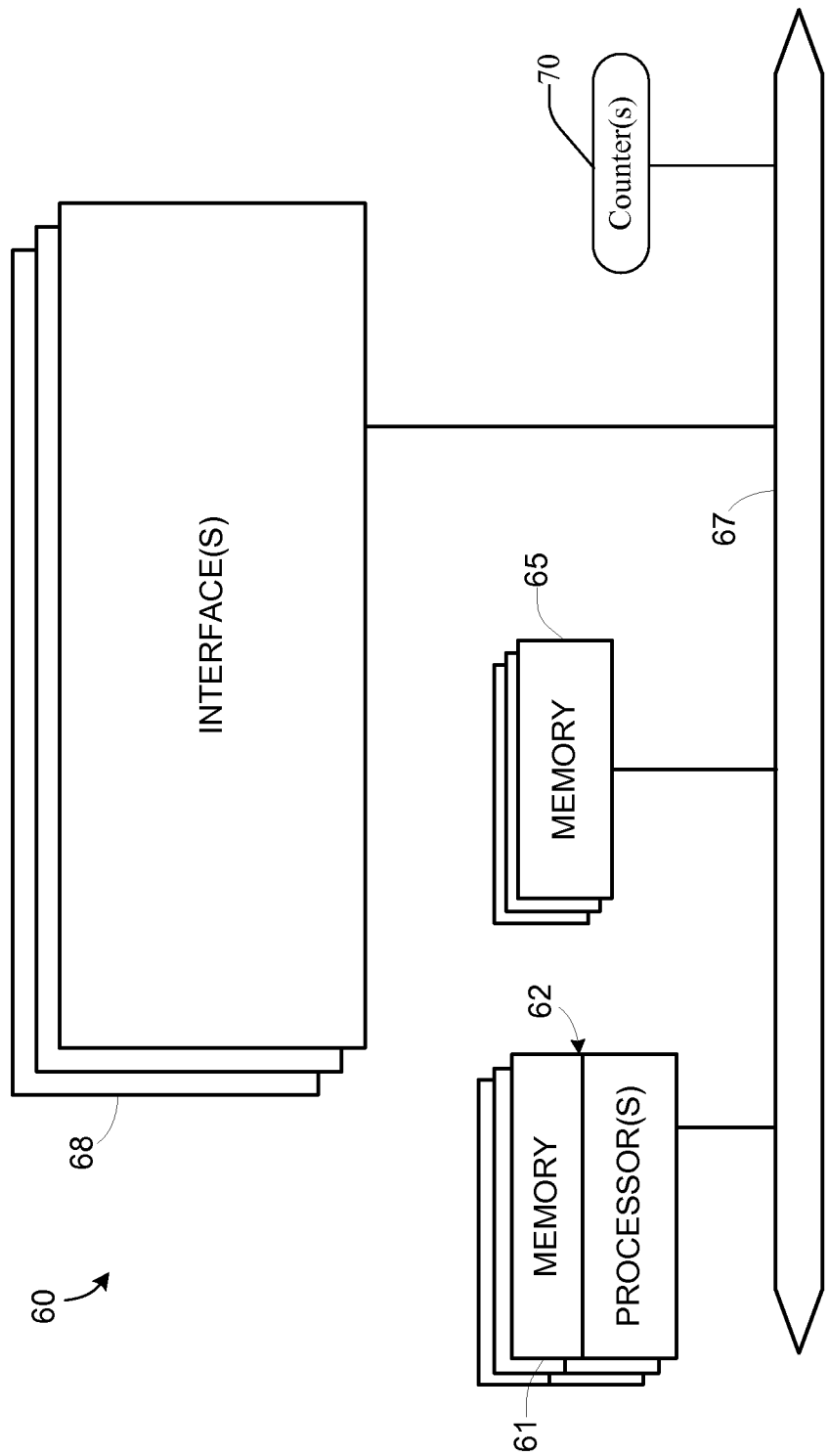
FIG. 9 is a block diagram of an example CMTS in accordance with particular embodiments.

FIG. 9 shows a block diagram of a particular embodiment of CMTS 104. In at least one embodiment, CMTS 104 may comprise at least one packet routing engine ("PRE"), herein also referred to as a "routing engine." In other embodiments, CMTS 104 may include multiple packet routing engines ("PREs").

Generally, at least a portion of the various techniques described herein may be implemented on software and/or hardware. For example, they can be implemented in an operating system kernel, in a separate user process, in a library package bound into network applications, on a specially constructed machine, or on a network interface card. In a specific embodiment, processes described herein may be implemented via software such as an operating system or in an application running on an operating system.

A software or software/hardware hybrid implementation of various processes described above may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. For example, in one embodiment, CMTS 104 may be implemented using specially configured routers or servers such as specially configured router models 1600, 2500, 2600, 3600, 4500, 4700, 7200, 7500, and 12000 available from Cisco Systems, Inc. of San Jose, Calif. In other embodiments, various processes may be implemented on a general-purpose network host machine, such as a personal computer or workstation. Further, at least some features described may be at least partially implemented on a card (e.g., an interface card) for a network device or a general-purpose computing device.

Referring to FIG. 9, CMTS 104 may include a master central processing unit (CPU) 62, interfaces 68, and at least one bus 67 (e.g., a PCI bus). When acting under the control of appropriate software or firmware, the CPU 62 may be responsible for implementing specific functions associated with the functions of a desired network device. For example, the CPU 62 may be responsible for analyzing packets, encapsulating packets, forwarding packets to appropriate network devices, calculating insertion rate estimates and/or desired insertion interval values, facilitating cable modem network sign-on activities, etc. In one embodiment, the CPU 62 may accomplish at least a portion of such functions under the control of software including an operating system, and any appropriate applications software.

CPU 62 may include one or more processors, such as a processor from the Motorola, AMD, Intel family of microprocessors, and/or the MIPS family of microprocessors. In a particular embodiment, CPU 62 may be implemented as specially designed hardware for controlling the operations of CMTS 104. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the CMTS 104. Among the interfaces that may be provided are Ethernet interfaces, baseband interfaces, backplane interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management, etc. By providing separate processors for the communications intensive tasks, these interfaces allow CPU 62 to efficiently perform other functions such as, for example, routing computations, network diagnostics, security functions, etc.

As shown in the example of FIG. 9, CMTS 104 may also include appropriate hardware and/or software suitable for implementing one or more counters 70. According to specific embodiments, at least one counter may be operable to track information relating to cable modem ranging requests.

In particular embodiments, the counter values may be used, for example, to determine an adjustment of the frequency of initial ranging or initial maintenance opportunities with respect to different physical and/or logical interfaces, channels, line cards, DOCSIS domains, and/or CMTS chassis. In different embodiments, the number of cable modem ranging requests may be used for a different purpose or purposes, such as, for example, determining an adjustment of different settings, parameters, and/or other characteristics relating to network performance and/or cable modem sign-on procedures.

Although the system shown in FIG. 9 illustrates one example of a CMTS device, it is by no means the only device architecture which may be used for implementing one or more of the techniques and/or features described herein. For example, an architecture having a single processor that handles communications as well as routing computations, etc. may be used. Further, other types of interfaces and media could also be used with the network device.

As illustrated in the example of FIG. 9, CMTS 104 it may employ one or more memories and/or memory modules (such as, for example, memory block 65), which, for example, may be operable to store data, program instructions for the general-purpose network operations and/or other information relating to the functionality of the cable modem ranging and/or other cable modem sign-on activities described herein. The program instructions may specify an operating system and one or more applications, for example. Such memory or memories may also be configured to store data structures and/or other specific non-program information described herein. In at least one embodiment, the memory module(s) may be non-volatile and/or volatile memory such as, for example, random access memory (e.g., synchronous dynamic random access memory (SDRAM)), etc.

Because such information and program instructions may be employed to implement the systems and methods described herein, various aspects are directed to machine-readable storage media that include program instructions, state information, etc. for performing various operations described herein. Examples of machine-readable storage media include, but are not limited to, magnetic media such as, for example, hard disks, floppy disks, and magnetic tape; optical media such as, for example, CD-ROM disks; magneto-optical media such as, for example, floptical disks; and hardware devices that are specially configured to store and perform program instructions, such as, for example, read-only memory devices (ROM) and random access memory (RAM). Examples of program instructions include both machine code, such as, for example, produced by a compiler, and files containing higher level code that may be executed by the computer using an interpreter.

One skilled in the art would appreciate that multiple processors, a variety of memory formats, and/or multiple system controllers, for example, can be used in this context as well as in other contexts described herein. The program instructions may control the operation of an operating system and/or one or more applications. The memory or memories may also be configured to store data structures, insertion interval tables, and/or other specific non-program information described herein.

Because such information and program instructions may be employed to implement the systems/methods described herein, machine readable storage media (e.g., which includes program instructions, state information, etc.) may be used for performing various operations described. Examples of machine-readable storage media include, but are not limited to, magnetic media such as hard disks, floppy disks, and magnetic tape; optical media such as CD-ROM disks; magneto-optical media such as floptical disks; and hardware devices that are specially configured to store and perform program instructions, such as ROM and RAM. Examples of program instructions include both machine code, such as produced by a compiler, and files containing higher level code that may be executed by the computer using an interpreter.

According to different embodiments, one or more of the routing engines may be configured to communicate with multiple line cards such as that illustrated, for example, in FIG. 8. According to a particular embodiment, the line cards may include different types of line cards which have been specifically configured to perform specific functions. For example, in one embodiment, some line cards may be implemented as radio-frequency (RF) line cards which have been configured and/or designed for use in a cable network. Additionally, some line cards may be implemented as network interface cards which have been configured and/or designed to interface with different types of external networks (e.g. WANs, LANs) utilizing different types of communication protocols (e.g. Ethernet, Frame Relay, ATM, TCP/IP, etc). For example, in at least one embodiment, one or more line cards may be operable to communicate with external data sources via, for example, optical fiber, microwave link, satellite link, and/or through various media. A data network interface may include hardware and software for interfacing to various networks. According to various embodiments, a data network interface may be implemented on a line card as part of a conventional router for a packet-switched network. Using this type of configuration, CMTS 104 may be able to send and/or receive IP packets to and from the data network interface using, for example, network layer software.

According to a specific embodiment, the operations associated with obtaining an IP address for cable modems may be implemented by appropriate network layer software at CMTS 104. This may involve CMTS 104 communicating with DHCP server 112 via a data network interface, for example.

In at least one embodiment, a portion of the line cards may include respective interface circuitry for providing an appropriate interface between the host line card, other line cards, and/or the routing engine(s). According to particular embodiments, the interface circuitry may be operable to function as a translator that converts conventional formats of data received at the line cards to a suitable protocol format for transmission from the line card to appropriate routing engine(s), line card(s), and/or other network devices.

At least some CMTS (or head end system) embodiments may be implemented on various general purpose CMTSs. In a specific embodiment, systems may be specially configured CMTSs such as, for example, specially configured models in the uBR-7200 and uBR-10012 series of CMTSs available from Cisco Systems, Inc. of San Jose, Calif.

Although the system shown in FIG. 9 represents one specific CMTS architecture, other implementations of CMTS 104 are possible. For example, other types of interfaces and media could also be used with CMTS 104.

Figure 10:
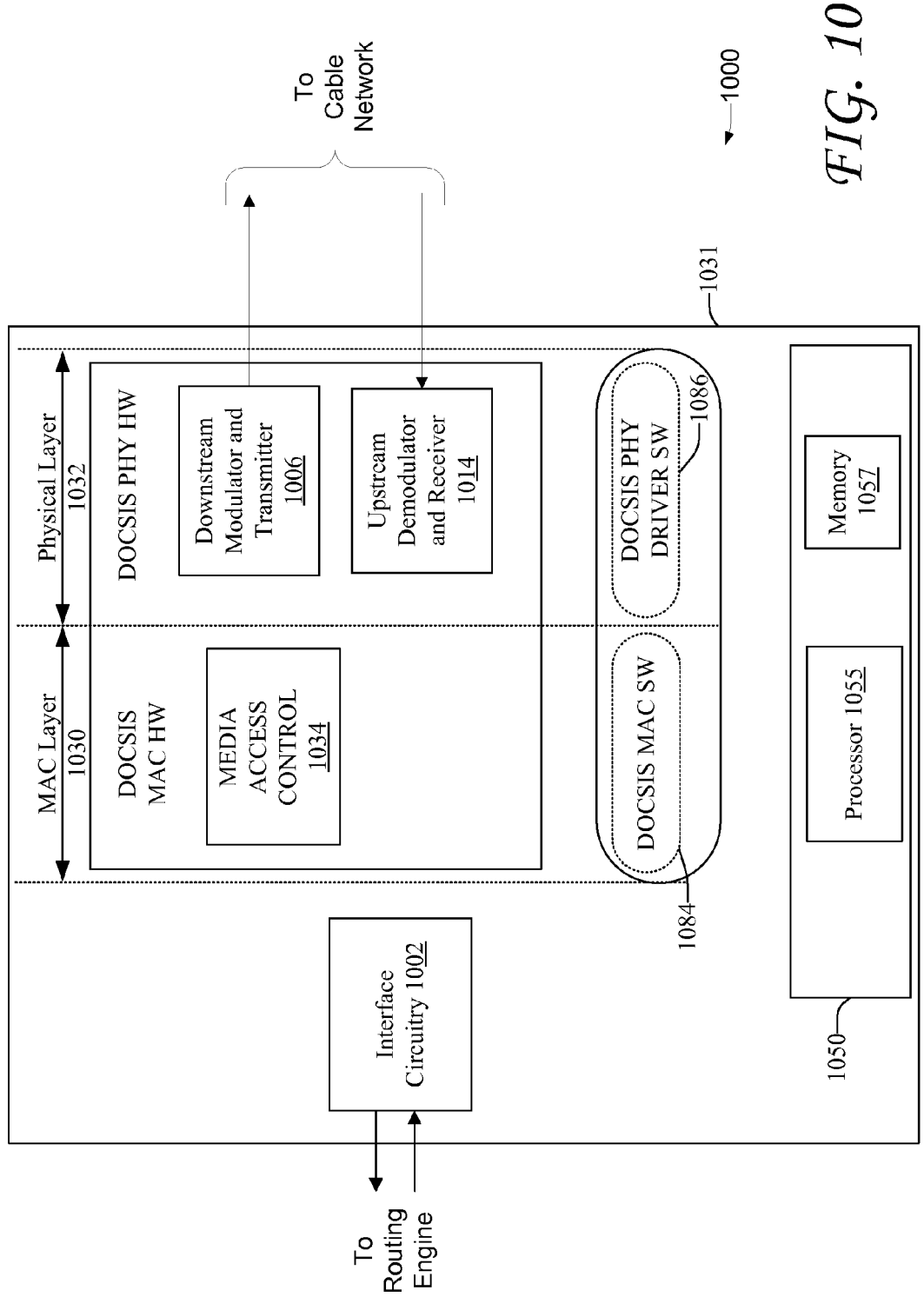
FIG. 10 is a block diagram of a line card configured to implement selected aspects of the DOCSIS functionality.

FIG. 10 shows a particular embodiment of a line card 1000. According to particular embodiment, line card 1000 may be configured and/or designed to implement selected aspects of the DOCSIS functionality such as, for example, DOCSIS MAC functionality and/or other functionality which conventionally has been implemented at CMTS 104.

In the specific embodiment as shown in FIG. 10, line card 1000 may be operable to provide functions on several network layers, including a physical layer 1032 and a MAC layer 1030. Generally, the physical layer is responsible for receiving and transmitting RF signals on the cable plant. Hardware portions of the physical layer include at least one downstream modulator and transmitter 1006 and/or at least one upstream demodulator and receiver 1014. The physical layer also includes software 1086 for driving the hardware components of the physical layer.

Upstream optical data signals (e.g., representing one or more packets) arriving via an optical fiber node may be converted to electrical signals, and then demodulated by the demodulator/receiver 1014. The demodulated information is then passed to MAC layer block 1030.

One purpose of MAC layer 1030 is to encapsulate, with MAC headers, downstream packets and decapsulate upstream packets. In at least one embodiment, the encapsulation and decapsulation proceed as dictated by the above-mentioned DOCSIS standard for transmission of data and/or other information. The MAC headers include addresses to specific modems (if sent downstream), and/or to the CMTS (if sent upstream). Note that the cable modems may also include MAC addressing components. For example, in one embodiment of the cable modems, these components encapsulate upstream data with a header containing the MAC address of the CMTS.

MAC layer 1030 includes a MAC hardware portion 1034 and a MAC software portion 1084. The MAC layer software portion may include software relating to DOCSIS MAC functionality, etc. The MAC layer hardware and software portions operate together to provide the MAC functionality, such as, for example, DOCSIS MAC functionality. In one embodiment, MAC controller 1034 may be dedicated to performing some MAC layer functions, and may be distinct from processor 1055.

In one embodiment, upstream information processed by MAC layer block 1030 may be forwarded to interface circuitry 1002. As described previously, interface circuitry 1002 includes appropriate hardware and/or software for converting data formats received at the line cards to a suitable protocol format for transmission from the line card to other appropriate devices, components and/or systems.

In one embodiment, when a packet is received from the routing engine at the interface circuitry 1002, the packet may be passed to MAC layer 1030. The MAC layer 1030 may transmit information via a one-way communication medium to downstream modulator and transmitter 1006. Downstream modulator and transmitter 1006 may be operable to take the data (or other information) in a packet structure and convert it to modulated downstream frames, such as, for example, MPEG and/or ATM frames, on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data may likewise be modulated using, for example, QAM16 and/or QSPK. According to a specific embodiment, the modulated data is converted from IF electrical signals to RF electrical signals (or vice-versa) using one or more electrical signal converters (not shown).

As shown in FIG. 10, line card 1000 includes a central hardware block 1050 including one or more processors 1055 and memory 1057. These hardware components interact with software and other hardware portions of the various layers within the line card. They provide general purpose computing power for much of the software. Memory 1057 may include, for example, I/O memory (e.g. buffers), program memory, shared memory, etc. One or more data structures used for implementing one or more embodiments may reside in such memory. In at least one embodiment, the software entities 1084, 1086 may be implemented as part of a network operating system running on hardware 1050. At least a part of the interface functionality described herein may be implemented in software as part of the operating system. In the example of FIG. 10, such software may be part of MAC layer software 1084, and/or may be closely associated therewith. A portion of the interface logic described herein could reside in hardware, software, or some combination of the two.

According to particulars embodiment, at least a portion of functions described herein which may be performed by CMTS 104, line cards (as shown in FIG. 10), and/or selected components thereof, may be implemented in a centralized CMTS system (e.g., residing at a Head End Complex of the cable network), and/or may be implemented at one or more distributed CMTS (DCMTS) systems (e.g. residing at one or more fiber nodes).

One or more embodiments may be implemented in any computer network having a standardized protocol for utilizing a central termination system (e.g. Head End) to schedule timeslots for remote stations and/or nodes on one or more return (or upstream) channel(s). In wireless networks, the central termination system may be referred to as a Head End and/or wireless base station. In satellite networks, the central termination system may be referred to as a master controlling station.

FIG. 11 shows an example of a wireless data communication system 1100 in accordance with particular embodiments. As shown in FIG. 11, the wireless system may include a central termination system (e.g., head end) 1120. In at least one embodiment, the head end may include an access controller and/or access control system (ACS) 1122 which communicates with a plurality of wireless nodes 1150, and coordinates access between each of the wireless nodes and head end 1120. Access controller 1122 may include memory and at least one processor. In a specific embodiment, the functions of access controller 1122 may be analogous to that of the CMTS described above with respect to cable modem networks. It may serve as a router and/or switch as well.

In one embodiment, the head end 1120 may be operable to communicate with the plurality of wireless nodes 1150 via any one of a plurality of wireless transmitting and receiving devices 1110. As shown in FIG. 11, for example, the plurality of wireless transmitting and receiving devices 1110 may include satellite base stations 1102, orbital satellites 1106, radio towers 1104, etc.

In a wireless system shown in FIG. 11 multiple nodes and/or hosts may correspond to multiple wireless nodes 1150 which use at least one shared access channel to communicate with at least one access control system 1122 located at the head end of the wireless system. For example, in one embodiment (such as, for example, one which may be analogous to that of cable modem networks), the head end 1120 of the wireless computer system communicates with multiple nodes 1150 via one or more downlink channels 1107 and/or one or more uplink channels 1109. At least one downlink channel 1107 may be configured as a broadcast-type channel utilized by the head end to communicate with an associated group of wireless nodes within the wireless network. At least one of uplink channel(s) 1109 may be configured or designed to as a shared-access channel, which is utilized by a group of wireless nodes (e.g., analogous to cable modems) to communicate with head end 1120. Access controller 1122 stores registration parameters for the various nodes that it services. It may also store the IP addresses for nodes that it services.

In a particular embodiment, the registration process and information is similar to that of the cable network CMTS described above. Moreover, one or more embodiments for interface capability over a shared access data network may be implemented in wireless system 1100.

Wireless devices and/or nodes 1150 may include any one of a number of wireless transmitting/receiving devices. For example, a satellite dish 1152 may be used to communicate with head end 1120 via the uplink and downlink channels. The satellite dish may, for example, be connected to a local area network (LAN) 1130 which, may be connected to one or more computer systems 1132. Another wireless device may be a portable/wireless computer system 1154, which is able to transmit and receive information to the head end via uplink and downlink channels 1107 and 1109. Other wireless devices 1156 may include, for example, wireless telephones, handheld computing devices, etc.

In particular embodiments where the uplink and downlink channels within wireless system 1100 may be utilized in a manner similar to that of the upstream and downstream channels of a cable modem network, the above-described interface techniques may easily be implemented in wireless system 1100 using one or more of the techniques described herein. Moreover, some embodiments may be easily implemented in any computer network which uses shared access channels for communicating between a centralized computing system and one or more remote nodes.

In particular embodiments, IPv6-enabled CMTS 104 having a DHCPv6 relay agent performs end user device debugging, where an end user device may be a cable modem or a CPE, using a MAC address as a qualifier for high-volume debugging commands on CMTS 104. This enables using numerous debugging facilities for trouble-shooting various features and areas of CMTS 104 when problems occur in a cable deployment. Error handling on CMTS 104 having a DHCPv6-enabled relay agent may also be performed using MAC addresses to identify errors related to specific modems and CPEs.

In particular embodiments, CMTS interface bundling for a stateful DHCPv6 relay agent may be supported by use of MAC addresses. De-multiplexing may be done based on MAC addresses of modems and CPEs. For example, bundling table 402 in FIG. 4 may be used to map a MAC address to a physical interface to determine which interface should be used to transmit a message to a cable modem. Related to interface bundling, CMTS DHCP gleaning functions may require various bundling operations. Each of these operations may use a MAC address.

DHCP lease query support is enabled because the MAC address is echoed from the DHCP server to the CMTS. In one embodiment, DHCP server 112 is informed of a specific format of the Interface ID option. In particular embodiments, CMTS 104 issues DHCPv6 or v4 lease queries the downstream direction as well as in the upstream direction. The lease query may be issued based on an IP address for DHCP server 112 to return the MAC address in the response.

In particular embodiments, by using the MAC address in DHCPv6 relay agent, no changes are needed to DHCP server 112 or to cable modems or CPEs. Only changes to the CMTS relay agent may be made. This consistency between IPv4 and IPv6 is highly desirable to MSOs, who are far more inclined to use MAC addresses rather than other identifiers available in DHCPv6, such as DUIDs.

Although illustrative embodiments and applications of this invention are shown and described herein, many variations and modifications are possible which remain within the concept, scope, and spirit of the invention, and these variations would become clear to those of ordinary skill in the art after perusal of this application. For example, although the Interface ID option of DHCPv6 has been used to illustrate particular embodiments, other options in the protocol which have the same properties may be used to transmit MAC addresses and other data. In another example, other hardware identifiers, such as DUIDs or Link-Local Addresses (LLAs) may be used to perform some of the functions on the CMTS and may be used as a key instead of the MAC address. Accordingly, the embodiments described are to be considered as illustrative and not restrictive, and the invention is not to be limited to the details given herein, but may be modified within the scope and equivalents of the appended claims.

We claim:

1. A network aggregator comprising:
   a processor; and
   a memory; wherein the processor and memory are configured to provide a Media Access Control (MAC) address insertion module for:
      obtaining a MAC address for a cable modem or customer premise equipment;
      receiving a DHCP message from the cable modem or customer premise equipment;
      inserting the MAC address into a specific option of the DHCP message received from the cable modem or customer premise equipment and sending the modified DHCP message to a DHCP server;
      receiving from the DHCP server a DHCP response message that includes an IP address for the cable modem or customer premise equipment and the specific option, including the MAC address, and wherein the specific option is returned unprocessed from the DHCP server to the network aggregator in response to the modified DHCP message, and
      relaying the DHCP response message to the cable modem or customer premise equipment by using the MAC address to determine a physical interface for the cable modem or the customer premise equipment;
   wherein the MAC address insertion module is further configured for using the MAC address for error analysis, debugging, and DHCP lease query.

2. A network aggregator of claim 1 wherein the specific option of the DHCP message is an Interface-Id option and wherein the MAC address insertion module further comprises an option length insertion module for inserting a length of the MAC address and an option identifier insertion module for inserting the MAC address into the Interface-Id option.

3. A network aggregator of claim 1 further comprising an error handling module and a debugging module for utilizing the MAC address to perform debugging with respect to the cable modem or the customer premise equipment.

4. A network aggregator of claim 1, wherein the processor and memory are further configured to (a) send a DHCP lease query for the IP address of the cable modem or customer premise equipment to the DHCP server and (b) receive a DHCP lease response including the MAC address for the cable modem or the customer premise equipment.

5. A network aggregator of claim 1, wherein other data related to interface bundling is inserted in the specific option of the DHCP message and received in the specific option of the DHCP response message.

6. A network aggregator of claim 5, wherein the other data comprises bundling data.

7. A network aggregator of claim 1, wherein an interface bundling table associates the MAC address with the physical interface, wherein a forwarding table associates the MAC address with the IP address for the cable modem or customer premise equipment, wherein relaying the DHCP response using the MAC address determine the physical interface is accomplished by:
   using the interface bundling and forwarding tables to map the MAC address to the physical interface and relay the encapsulated DHCP response via the physical interface to the cable mode or customer service equipment.

8. A network aggregator of claim 1 wherein the network aggregator is a cable modem termination system (CMTS).

9. A method, comprising:
   at a network aggregator, obtaining a MAC address for a cable modem or customer premise equipment;
   at the network aggregator, receiving a DHCP message from the cable modem or customer premise equipment;
   at the network aggregator, inserting the obtained MAC address into a specific option of the DHCP message received from the cable modem or customer premise equipment and sending the modified DHCP message to a DHCP server;
   at the network aggregator receiving from the DHCP server a DHCP response message that includes an IP address for the cable modem or customer premise equipment and the specific option, including the MAC address, and wherein the specific option is returned unprocessed from the DHCP server to the network aggregator in response to the DHCP message, and
   at the network aggregator, relaying the DHCP response message to the cable modem or customer premise equipment by using the MAC address returned unprocessed in the DHCP response message to determine a physical interface for the cable modem or the customer premise equipment; and
   using the MAC address for error analysis, debugging, and DHCP lease query.

10. A method of claim 9, wherein the specific option of the DHCP message is an Interface-Id option, the method further comprises inserting a length of the MAC address and inserting the MAC address into the Interface-Id option.

11. A method of claim 9, further comprising utilizing the MAC address to perform debugging with respect to the cable modem or the customer premise equipment.

12. A method of claim 9, further comprising:
   sending a DHCP lease query for the IP address of the cable modem or customer premise equipment to the DHCP server; and
   receiving a DHCP lease response that includes the MAC address for the cable modem or the customer premise equipment.

13. A method of claim 9, wherein other data related to interface bundling is inserted in the specific option of the DHCP message and received in the specific option of the DHCP response message.

14. A method of claim 13, wherein the other data comprises bundling data.

15. A method of claim 9, wherein an interface bundling table associates the MAC address with the physical interface, wherein a forwarding table associates the MAC address with the IP address for the cable modem or customer premise equipment, wherein relaying the DHCP response using the MAC address to determine the physical interface is accomplished by:
   using the interface bundling and forwarding tables to map the MAC address to the physical interface and relay the encapsulated DHCP response via the physical interface to the cable mode or customer service equipment.

16. At least one non-transitory machine-readable storage media that includes program instructions for performing the following operations:
   at a network aggregator, obtaining a MAC address for a cable modem or customer premise equipment;
   at the network aggregator, receiving a DHCP message from the cable modem or customer premise equipment;
   at the network aggregator, inserting the MAC address into a specific option of the DHCP message received from the cable modem or customer premise equipment and sending the modified DHCP message to a DHCP server;
   at the network aggregator, receiving from the DHCP server a DHCP response message that includes an IP address for the cable modem or customer premise equipment and the specific option, including the MAC address, and wherein the specific option is returned unprocessed from the DHCP server to the network aggregator in response to the modified DHCP message, and at the network aggregator, relaying the DHCP response message to the cable modem or customer premise equipment by using the MAC address to determine a physical interface for the cable modem or the customer premise equipment; and utilizing the MAC address for error analysis, debugging, and DHCP lease query.

17. An at least one non-transitory machine-readable storage media of claim 16, wherein the program instructions are further configured for using the MAC address to perform debugging with respect to the cable modem or the customer premise equipment.

18. An at least one non-transitory machine-readable storage media of claim 16, wherein the program instructions are further configured for:

sending a DHCP lease query for the IP address of the cable modem or customer premise equipment to the DHCP server; and receiving a DHCP lease response that includes the MAC address for the cable modem or the customer premise equipment.

19. An at least one non-transitory machine-readable storage media of claim 16, wherein other data related to interface bundling is inserted in the specific option of the DHCP message and received in the specific option of the DHCP response message.

* * * * *